US011210156B1

United States Patent
Liu et al.

(10) Patent No.: US 11,210,156 B1
(45) Date of Patent: Dec. 28, 2021

(54) INTELLIGENT DISTRIBUTED TRACING

(71) Applicant: International Business Machines Corporation, Armonk, NY (US)

(72) Inventors: Xin Peng Liu, Beijing (CN); Yue Wang, Beijing (CN); Wei Wu, Beijing (CN); Ju Bo Tian, Xi'an (CN); Jing Jing Pan, Beijing (CN); Liang Wang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/034,187

(22) Filed: Sep. 28, 2020

(51) Int. Cl.
*G06F 11/07* (2006.01)

(52) U.S. Cl.
CPC ...... *G06F 11/0778* (2013.01); *G06F 11/0709* (2013.01); *G06F 11/079* (2013.01); *G06F 11/0751* (2013.01)

(58) Field of Classification Search
CPC .......... G06F 11/0778; G06F 11/0709; G06F 11/0751; G06F 11/079
See application file for complete search history.

(56) References Cited

U.S. PATENT DOCUMENTS

| | | | | |
|---|---|---|---|---|
| 9,274,919 | B2* | 3/2016 | Greifeneder | G06F 9/45504 |
| 2013/0111011 | A1* | 5/2013 | Moulhaud | G06F 16/958 |
| | | | | 709/224 |
| 2021/0149787 | A1* | 5/2021 | Nguyen | G06F 11/3006 |
| 2021/0248023 | A1* | 8/2021 | Brown | G06F 11/0709 |

FOREIGN PATENT DOCUMENTS

WO  WO-2020087082 A1 * 4/2020 ............ H04L 43/18

OTHER PUBLICATIONS

"Discuss post-trace (tail-based) sampling #425", GitHub, Issue opened Sep. 24, 2017, 9 pages, <https://github.com/jaegertracing/jaeger/issues/425>.
"Trace Sampling and Storage", Datadog, downloaded from the internet on Jul. 6, 2020, 8 pages, <https://docs.datadoghq.com/tracing/guide/trace_sampling_and_storage/?tab=java#manually-control-trace-priority>.
Flanders, Steve, "Intelligent Sampling With OpenCensus", SFlanders, Apr. 17, 2019, 7 pages, <https://sflanders.net/2019/04/17/intelligent-sampling-with-opencensus/>.
Mell et al., "The NIST Definition of Cloud Computing", Recommendations of the National Institute of Standards and Technology, NIST Special Publication 800-145, Sep. 2011, 7 pages.

* cited by examiner

*Primary Examiner* — Matthew M Kim
*Assistant Examiner* — Kyle Emanuele
(74) *Attorney, Agent, or Firm* — Gilbert Harmon, Jr.

(57) ABSTRACT

An approach for distributed tracing is provided. The approach for distributed tracing comprises receiving a user request for a transaction by one or more processing units, and extracting feature data from the received user request by one or more processing units. Further, if the extracted feature data matches at least one policy generated based on at least one error response received from at least one service is determined by one or more processing units and the at least one service is instructed to collect tracing data for the transaction in a head-based fashion responsive to the extracted feature data matching at least one policy by one or more processing units.

17 Claims, 6 Drawing Sheets

INTELLIGENT DISTRIBUTED TRACING

BACKGROUND

The present application relates generally to workflow tracing, and more specifically, to distributed tracing in a distributed environment.

Tracing provides a mechanism to collect diagnostic information on a system, e.g., a workflow, process, program, etc. Tracing can also provide clues on anomalistic request flows, i.e., the 99.9 percentile of operation. The issues can still be related to performance or help identify problems with "correctness" like component failures or timeouts. Two exemplary types of tracing are "head-based" and "tail-based." In "head-based" tracing, a random sampling decision is made at the start of a workflow, and then tracked through the system until completion. In "tail-based" tracing, the random sampling decision is made at the end of a workflow, implying some caching of events associated with the system. Tail-based sampling requires a greater level of intelligence but is particularly useful for tracing anomalistic behavior.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products for distributed tracing are described.

One example embodiment provides a computer-implemented method for distributed tracing. A user request for a transaction is received by one or more processing units, and feature data is extracted from the received user request by one or more processing units. Then whether the extracted feature data matches at least one policy generated based on at least one error response received from at least one service is determined by one or more processing units and the at least one service is instructed to collect tracing data for the transaction in a head-based fashion responsive to the extracted feature data matching at least one policy by one or more processing units.

Another example embodiment provides a computer-implemented system for distributed tracing comprising a memory medium comprising program instructions, and a processor, for executing the program instructions, when executing the program instructions causes the system to receive a user request for a transaction, extract feature data from the received user request, determine whether the extracted feature data matches at least one policy generated based on at least one error response received from at least one service, and instruct the at least one service to collect tracing data for the transaction in a head-based fashion responsive to the extracted feature data matching at least one policy.

A further example embodiment provides a computer program product for distributed tracing comprising a non-transitory computer readable storage having program codes embodied therewith, the program codes comprising program codes to receive a user request for a transaction, program codes to extract feature data from the received user request program codes to determine whether the extracted feature data matches at least one policy generated based on at least one error response received from at least one service; and program codes to instruct the at least one service to collect tracing data for the transaction in a head-based fashion responsive to the extracted feature data matching at least one policy.

These and other features and advantages will be described in or will become apparent to those of ordinary skill in the art in view of, the following detailed description of the example embodiments of the present invention.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
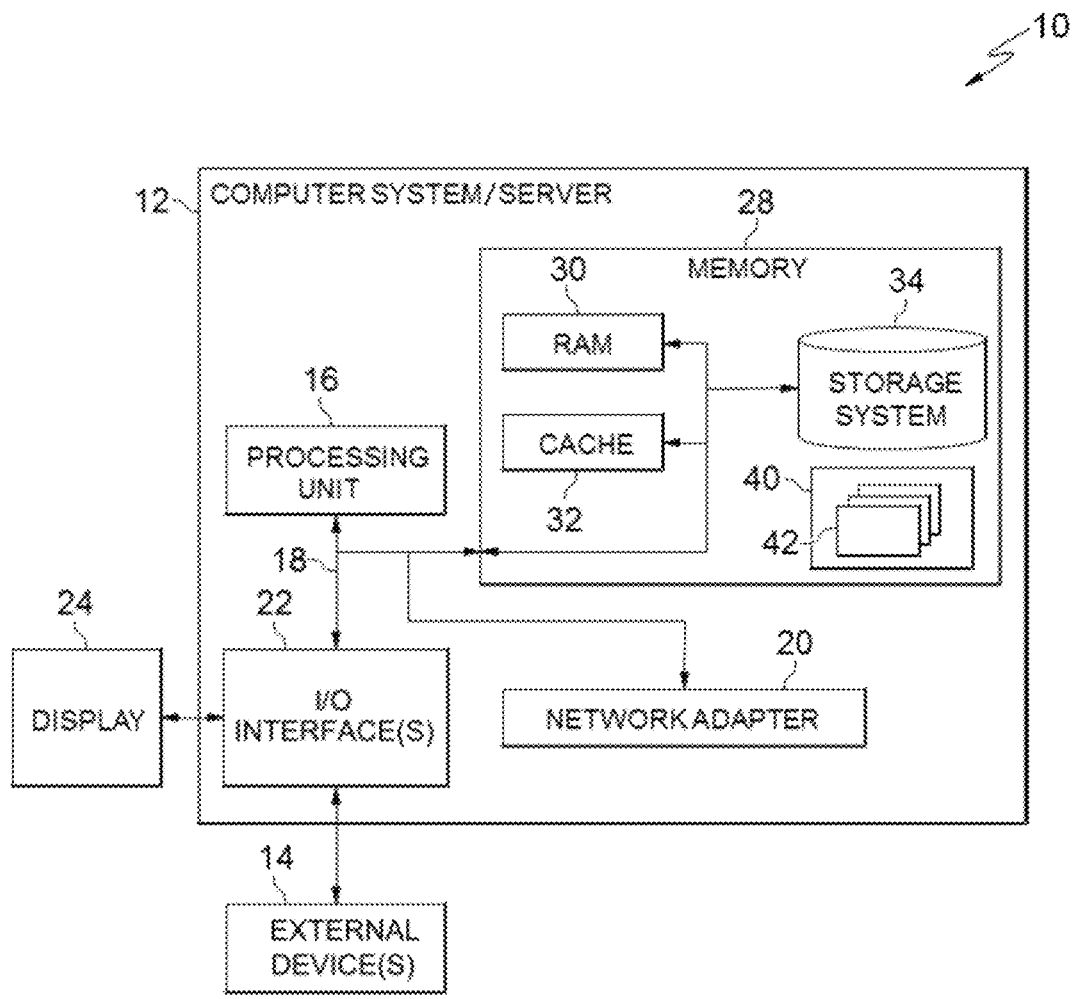
FIG. 1 depicts a cloud computing node according to an embodiment of the present invention.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown, according to an embodiment of the present invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general-purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
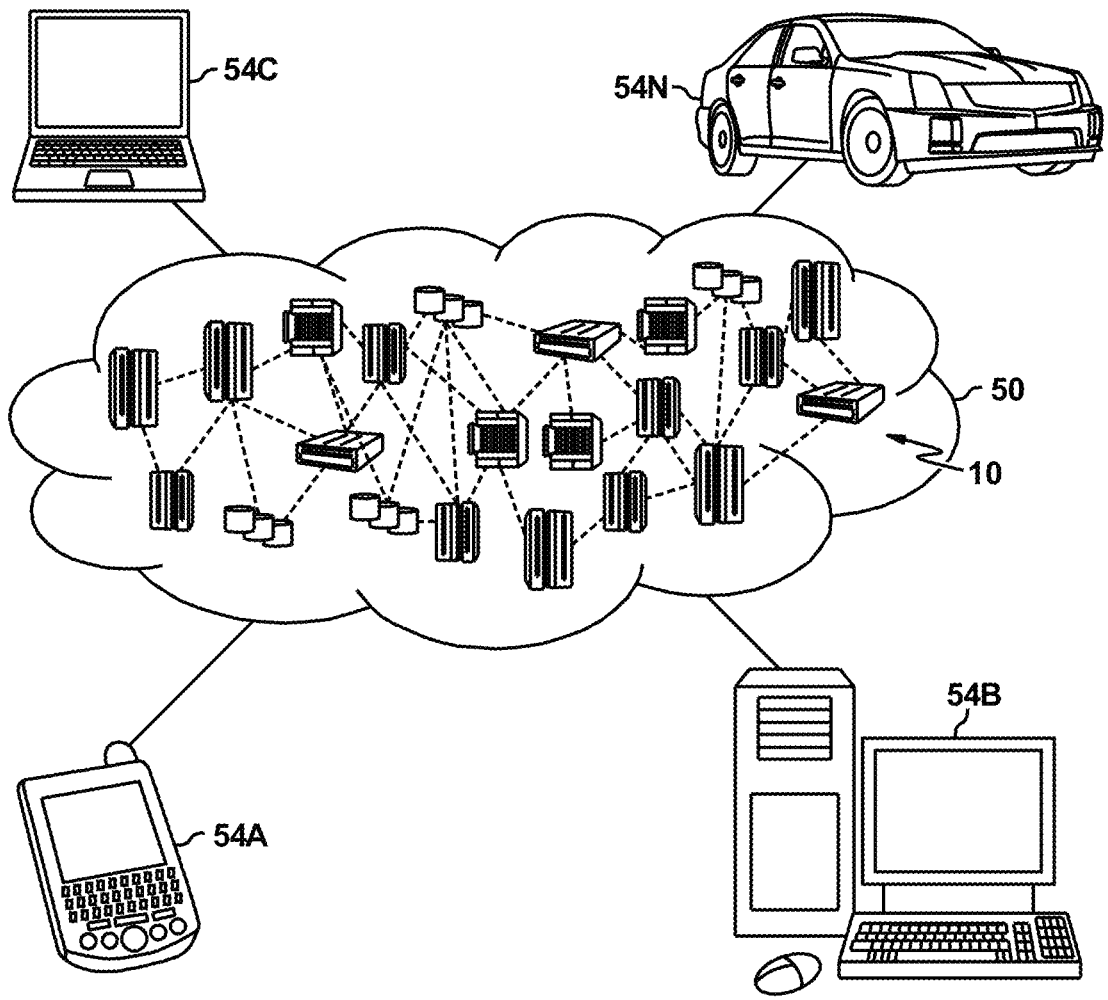
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
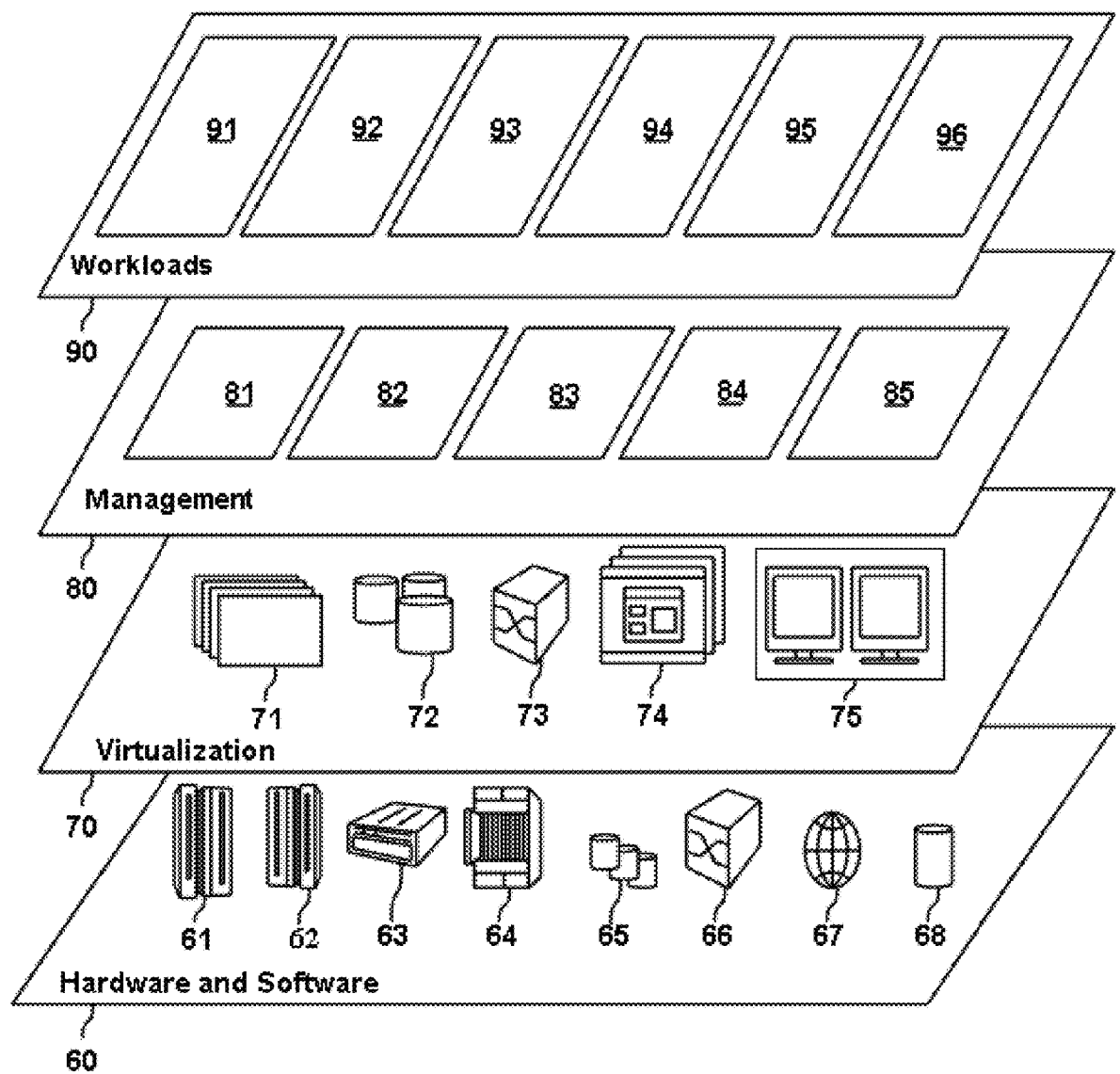
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 may include hardware and software components. Examples of hardware components may include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracing as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and distributed tracing 96 according to embodiments of the invention.

Modern services running in distributed computing systems such as cloud environments are large, complex, and depend on other similarly complex distributed services to accomplish their goals. Distributed systems give clear benefits, especially with scalability, reliability, and maintainability. The biggest drawback, however, is that distributed systems break traditional methods of profiling, debugging, and monitoring. Such methods were designed to capture information in a component—or machine-centric way because they were designed when applications only ran on a single machine. By contrast, in distributed systems, it is more focused on end-to-end executions of requests across multiple components and machines. Traditional methods are not enough for distributed systems because they lack visibility due to the reasons that they weren't designed to be able to correlate and combine events across multiple components and machines. To address the above-mentioned issue, distributed tracing, also called distributed request tracing, which is designed to meet the profiling, debugging, and monitoring needs of modern, distributed systems has been developed. Distributed tracing captures the workflow of causally related events (e.g., work done to process a request) within and among the components of a distributed system. As distributed systems grow in scale and complexity, such tracing is becoming a critical tool for understanding distributed system behaviors.

Distributed tracing, however, has certain limitations. When deploying distributed tracing, a number of practical choices have to be made. For example, the following three fundamental factors need to be in consideration:

generating trace data: choosing where in an application useful data exists, and instrumenting the application to record it;

collecting and storing trace data: deciding under what circumstances trace data should be omitted, and how to route it from its origin to the tracing backends; and extracting value from data: using traces to profile, monitor, and debug the application in a meaningful way.

Conventionally, distributed tracing addresses the volume of trace data generated via upfront (or 'head-based') sampling. Conventional distributed tracing solutions will "throw away" some fixed amount of traces upfront to improve application and monitoring system performance. The drawback is that it's statistically likely that the most important outliers will be discarded. When anomalous, performance-impacting transactions are discarded and not considered, the aggregate latency statistics will be inaccurate and valuable traces will be unavailable for debugging critical issues. Tail-based sampling, where the sampling decision is deferred until the moment individual transactions have completed, can be an improvement.

However, the downside, particularly for agent-based solutions, is increased memory load on the hosts because all of the span data must be stored for the transactions that are "in-progress". It is clear that the two types of distributed tracing each has corresponding drawbacks. Compared with head-based sampling that may potentially discard performance-impacting transactions which leads to inaccuracy, tail-based sampling will provide better performance if the issue of increased memory load on the hosts is resolved. Embodiments of the invention are addressing the issues discussed herein.

Figure 4:
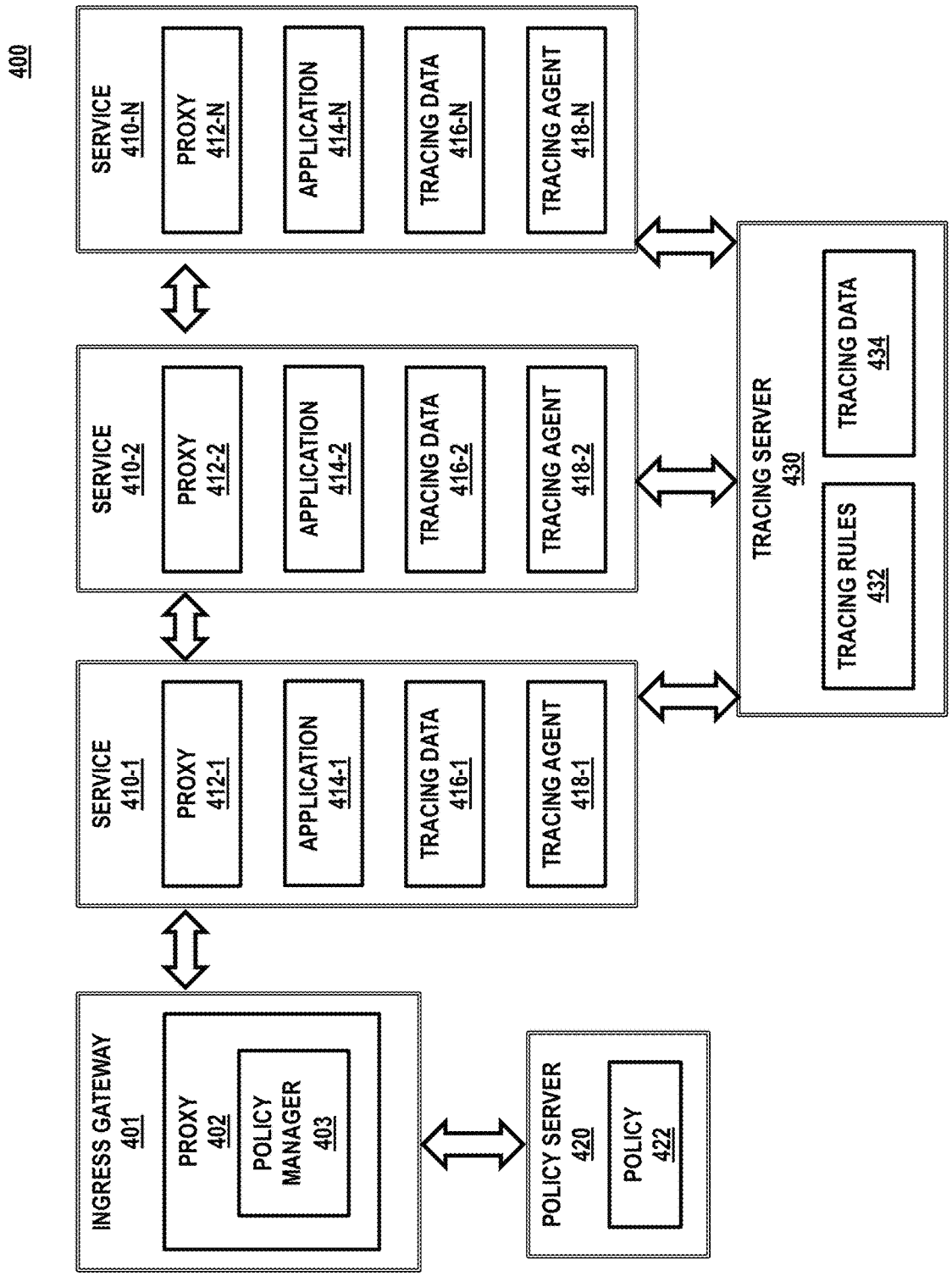
FIG. 4 depicts a block diagram of an exemplary system 400 for distributed tracing according to an embodiment of the present invention.

Referring now to FIG. 4, in which a block diagram of an exemplary system 400 for distributed tracing according to an embodiment of the invention is depicted. The system 400, according to an embodiment of the invention, is illustrated in FIG. 4 with a microservice architecture as an example of distributed system, however, embodiments of the invention is not limited to the microservice architecture and may be applied to any other types of distributed systems. The system 400 comprises an ingress gateway 401 which comprises a proxy 402. The ingress gateway 401 works with a service mesh to route traffic, e.g., the service mesh that comprises a plurality of services that are respectively encapsulated, for example, in respective pods (for example, services 410-1, 410-2, ..., 410-N shown in FIG. 4). A pod represents a unit of deployment, which might consist of either a single container or a small number of containers that are tightly coupled and that share resources. The ingress gateway 401 may operate at the edge of the service mesh, receiving incoming HTTP/TCP connections while configuring ports, protocols and virtual services, e.g., loading balancing, web application firewall and etc. Responsive to receiving a user request, the ingress gateway 401 routes the user request into the service mesh via a proxy 402. The proxy 402, according to an embodiment of the invention, is a modified proxy (compared with proxies in existing solutions) that comprises a policy manager 403, aside from other functionalities same as a proxy in existing technologies. The policy manager 403 may manage policies by adding policies generated based on error responses returned and removing policies that are no longer accurate or needed. An error response is returned to respond to a user request received by the ingress gateway 401 if an error occurs, or a service is failed to be provided to the user request. Details of the generation of policies based on returned error responses will be discussed later. According to an embodiment of the invention the policy manager 403 of the modified proxy 402 may be communicative with a policy server 420 that is configured to store one or more polices 422. The policy manager 403 may synchronize one or more policies generated based on returned error responses with the policy server 420, or alternatively retrieve from the policy server 420, one or more polices 422. It should be pointed out that the policy server 420 may or may not exist according to different implementations.

Also shown in FIG. 4, the system 400 for distributed tracing further comprises a service mesh which comprises a plurality of services 410-1, 410-2, ..., 410-N. According to an embodiment of the invention, the plurality of services 410-1, 410-2, ..., 410-N may be in the form of pods with each of the which comprising a corresponding application 414-1, 414-2, ..., 414-$n$ that implements a corresponding service logic. Each of the plurality of services may be encapsulated in a corresponding pod and may be communicative with the ingress gateway 401 and with each other via respective proxies 412-1, 412-2, ..., 412-N that handle respective communications. The system 400 further comprises a plurality of tracing agents 418-1, 418-2, ..., 418-N running in respective services 410-1, 410-2, ..., 410-N that are responsible for collecting respective tracing data 416-1, 416-2, ..., 416-N. The plurality of tracing agents 418-1, 418-2, ..., 418-N may send corresponding tracing data 416-1, 416-2, ..., 416-N to a tracing server 430 coupled to the plurality of services 410-1, 410-2, ..., 410-N in the service mesh, based on tracing rules 432 defined in the tracing server 430. The tracing server 430 that is communicative with the plurality of the services 410-1, 410-2, ..., 410-N in the service mesh may receive corresponding tracing data 416-1, 416-2, ..., 416-N from respective tracing agents 418-1, 418-2, ..., 418-N and store in the tracing server 430 as tracing data 434.

In tail-based distributed tracing, tracing data 416-1, 416-2, ..., 416-N are collected for all transactions by tracing agents 418-1, 418-2, ..., 418-N and stored in the local environment (local storage) of respective services 410-1, 410-2, ..., 410-N. When a transaction is finished, each of the tracing agents 418-1, 418-2, ..., 418-N may send a tracing data summary corresponding to the transaction to the tracing server 430 where whether a received tracing data summary of a transaction matches at least one tracing rule 432 is determined. If a match is determined, the tracing server 430 may send instructions to the corresponding services, instructing their corresponding tracing agents to send the corresponding tracing data of the transaction (where a match is determined) to the tracing server. For the tracing data summaries that do not match any tracing rules 432, the tracing server 430 may send instructions to the corresponding services, instructing their corresponding tracing agents to delete the corresponding tracing data. Before getting instructions from the tracing server 430, each of the services 410-1, 410-2, . . . , 410-N needs to store a copy of tracing data in the local environment. Storing tracing data in local environment may increase memory load significantly if there is a large amount of tracing data.

Different from the above-mentioned common approach of tail-based distributed tracing, according to an embodiment of the invention, in response to receiving response data returned to a user request for a transaction from the service mesh by the proxy 402 of the ingress gateway 401, it is determined whether the received response data indicates an error response. This could be easily done by reading a response status code in the returned response data. For example, a status code 400 indicates a 'bad request' error according to HTTP standard. If it is determined that the returned response data indicates an error response, the policy manager 403 may generate a policy based on the received response data. The generated policy will be used to control the tracing of transactions, where if a user request for a transaction matches a policy, the tracing of the transaction will be in a head-based fashion. The policy manager 403 may add the generated policy locally to the proxy 402 of the ingress gateway 401 and synchronize with the policy 422 in the policy server 420. With generated policies, when receiving a user request for a transaction, the proxy 402 of the ingress gateway 401 may first extract feature data from the received user request, and then determine whether the extracted feature data matches at least one policy (synchronized with the policy 422 in the policy server 420 or retrieved from the policy 422 of the policy server 420, and stored locally in the policy manager 403). If it is determined that the extracted feature data matches at least one policy, the proxy 402 of the ingress gateway 401 may instruct respective services of the service mesh to collect tracing data for the transaction (with user request matching at least one policy) in a head-based fashion, i.e., tracing data collected for the transaction will be sent to the tracing server 430 directly without storing in a corresponding local environment, e.g., service 410-1, 410-2, . . . , or 410-N. This may be done, e.g., by modifying a trace type field in the SpanContext by the proxy 402 of the ingress gateway 401. If it is determined that the extracted feature data does not match any one of the at least one policy, the proxy 402 of the ingress gateway 401 may instruct respective services of the service mesh to collect tracing data for the transaction in a tail-based fashion, i.e., tracing data collected for the transaction will firstly be stored in the local environment of respective services, then be sent to the tracing server or be deleted from the local environment of respective services responsive to receiving instructions from the tracing server 430, as described in the above. By selecting transactions with error response returned for head-based tracing, such that tracing data collected for the selected transactions may be sent to the tracing server directly without storing in local environment, embodiments of the invention may enhance the performance of tail-based distributed tracing and the drawbacks of tail-based tracing discussed above may be mitigated.

In the following, the generation of policies based on returned response data will be discussed in detail with some exemplary examples, however it should be pointed out that the exemplary examples are merely for the purpose of illustration and thus will not adversely limit the scope of the invention. Modifications and adaptions may be accomplished by those skilled in the art without departing the spirit of the invention.

For example, a user request curl -x POST -H 'Content-Type: application/json'-i http://localhost:800/api/order --data '{"token": "xxxxxx", "data":{"num": "2"}' is received by the proxy 402 of the ingress gateway 401 and then is routed to the service mesh. After being processing by the service mesh, response data comprising information {"status": "400", "type": "about:blank", "title": "bad request"} returned to the user request is received by the proxy 402 of the ingress gateway 401. It is determined by the proxy 402 that the response data indicates an error response based on the status code "400", which is a status code indicating that the user request cannot or will not be processed due to an apparent client error (e.g., malformed request syntax, size too large, invalid request message framing, or deceptive request routing) according to HTTP protocol. Then, the policy manager 403 may generate a policy based on the response data (that is determined to indicate an error response) such that in the future, if a user request for a transaction matches the generated policy, the tracing of the transaction will be in a head-based fashion, i.e., tracing data collected for the transaction will be sent to the tracing server 430 directly without storing in a corresponding local environment, e.g., service 410-1, 410-2, . . . , or 410-N. The policy manager 403 may first extract feature data of the user request and corresponding response data and use the extracted feature data to generate the policy. An example of the generated policy may be in the following format:

```
{
  "request_url": "http://localhost:8000/api/order",
  "method": "post",
  "response_code": "400",
  "request_data": {
    "token": "xxxxx",
    data: {
      "num": "2"
    }
  }
}
```

For another example, a user request curl -x POST -H 'Content-Type: application/json'-i http://localhost:800/api/userb --data '{"token":"xxxxxx"}' is received by the proxy 402 of the ingress gateway 401 and then is routed to the service mesh. After being processing by the service mesh, response data comprising information {"status": "403", "type": "about:blank", "title": "forbidden"} returned to the user request is received by the proxy 402 of the ingress gateway 401. It is determined by the proxy 402 that the response data indicates an error response based on the status code "403", which is a status code indicating that access to the requested resource is forbidden for some reason—although the server understood the request, but will not fulfill it due to client-related issues. Then, the policy manager 403 may generate a policy based on the response data (that is determined to indicate an error response) such that in the future, if a user request for a transaction matches the generated policy, the tracing of the transaction will be in a head-based fashion, i.e., tracing data collected for the transaction will be sent to the tracing server 430 directly without storing in corresponding local environment, e.g., service 410-1, 410-2, . . . , or 410-N. The policy manager 403 may first extract feature data of the user request and corresponding response data and use the extracted feature data to generate the policy. An example of the generated policy may be in the following format:

```
{
    "request url": http://localhost:8000/api/user,
    "method": "post",
    "response_code": "403",
    "request_data": {
        "token": "xxxxx",
    }
}
```

According to an embodiment of the invention, the policy manager 403 may also utilize artificial intelligence (AI) to assist the generation of policies. For example, the policy manager 403 may generate training data based on extracted feature data and train a neural network (e.g. a convolutional neural network (CNN), or a recurrent neural network (RNN), etc.) to learn and extract user request patterns for failed transactions (transactions with error response returned) on different services along the invocation path, distill the extracted user request patterns and generate policies. According to an embodiment of the invention, policies may be updated periodically.

According to an embodiment of the invention, in response to receiving further response data returned to a user request for a transaction from the service mesh by the proxy 402 of the ingress gateway 401, it is determined whether the received response data indicates an error response of a new type and if yes, the policy manager 403 may generate a new policy based on the received further response data. The policy manager 403 may add the generated new policy locally to the proxy 402 of the ingress gateway 401 and synchronize with the policy 422 in the policy server 420. According to an embodiment of the invention, for a transaction with corresponding tracing data has been instructed to be collected in a head-based fashion, whether the transaction is successful is determined when the transaction is finished and if yes, the policy manager 403 may remove the policy corresponding to the transaction locally to the proxy 402 of the ingress gateway 401 and synchronize with the policy 422 in the policy server 420. It should be pointed out that the policy server 420 may or may not exist according to different implementations.

Figure 5:
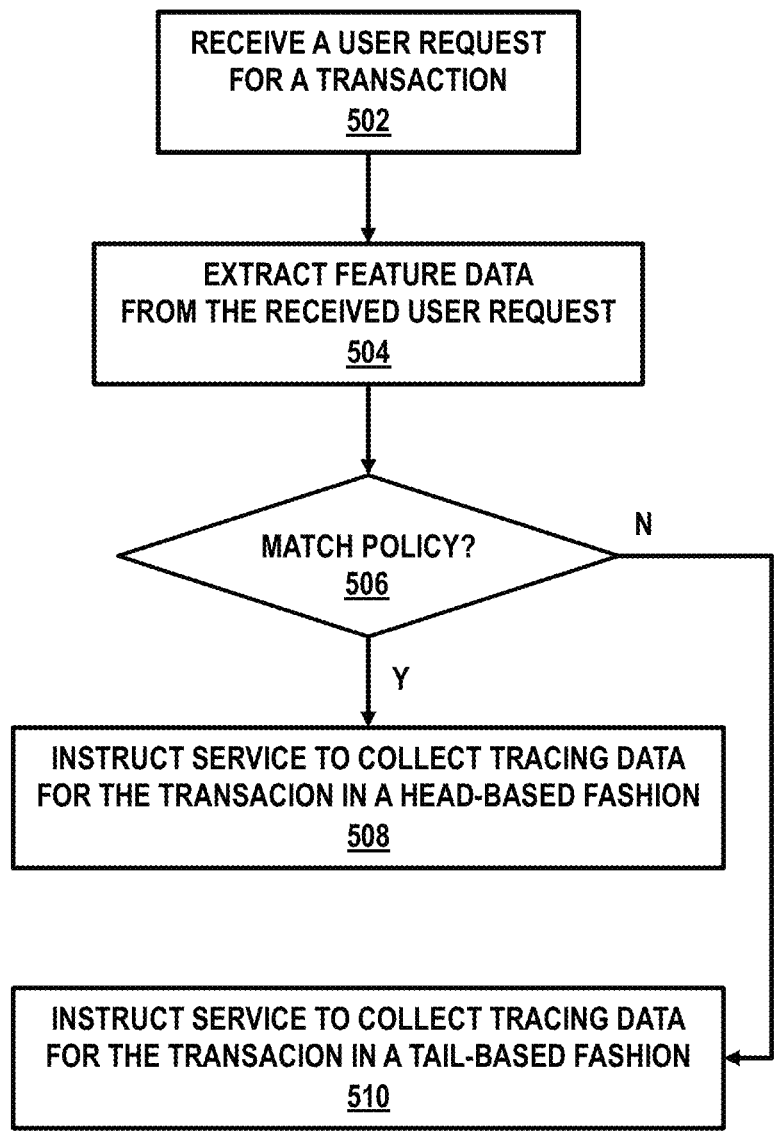
FIG. 5 depicts a flowchart of an exemplary method 500 according to an embodiment of the present invention.

Now referring to FIG. 5, which depicts a flowchart of an exemplary method 500 according to an embodiment of the present invention. At step 502 of the method 500, a user request for a transaction may be received, for example, by the ingress gateway 401 of the system 400 in FIG. 4. Then at step 504, feature data may be extracted from the received user request, for example, by the ingress gateway 401 of the system 400 in FIG. 4. At step 506, it may be determined whether the extracted feature data matches at least one policy generated based on at least one error response received from at least one service, e.g., services 410-1, 410-2, . . . , 410-N in FIG. 4. And then at step 506, the at least one service may be instructed to collect tracing data for the transaction in a head-based fashion 508 responsive to the determination at step 506 indicating that the extracted feature data matches at least one policy, i.e., tracing data collected for the transaction will be sent to a tracing server (e.g., the tracing server 430 in FIG. 4) directly without storing in corresponding local environment (e.g., service 410-1, 410-2, . . . , or 410-N in FIG. 4). If, however, the determination at step 506 indicating that the extracted feature data does not match any one of the at least one policy, the at least one service may be instructed to collect tracing data for the transaction in a tail-based fashion 510, i.e., tracing data collected for the transaction will firstly be stored in the local environment of respective services (e.g., service 410-1, 410-2, . . . , or 410-N in FIG. 4), then be sent to the tracing server (e.g., the tracing server 430 in FIG. 4) or be deleted from the local environment of respective services (e.g., service 410-1, 410-2, . . . , or 410-N in FIG. 4) responsive to receiving instructions from the tracing server (e.g., the tracing server 430 in FIG. 4).

Figure 6:
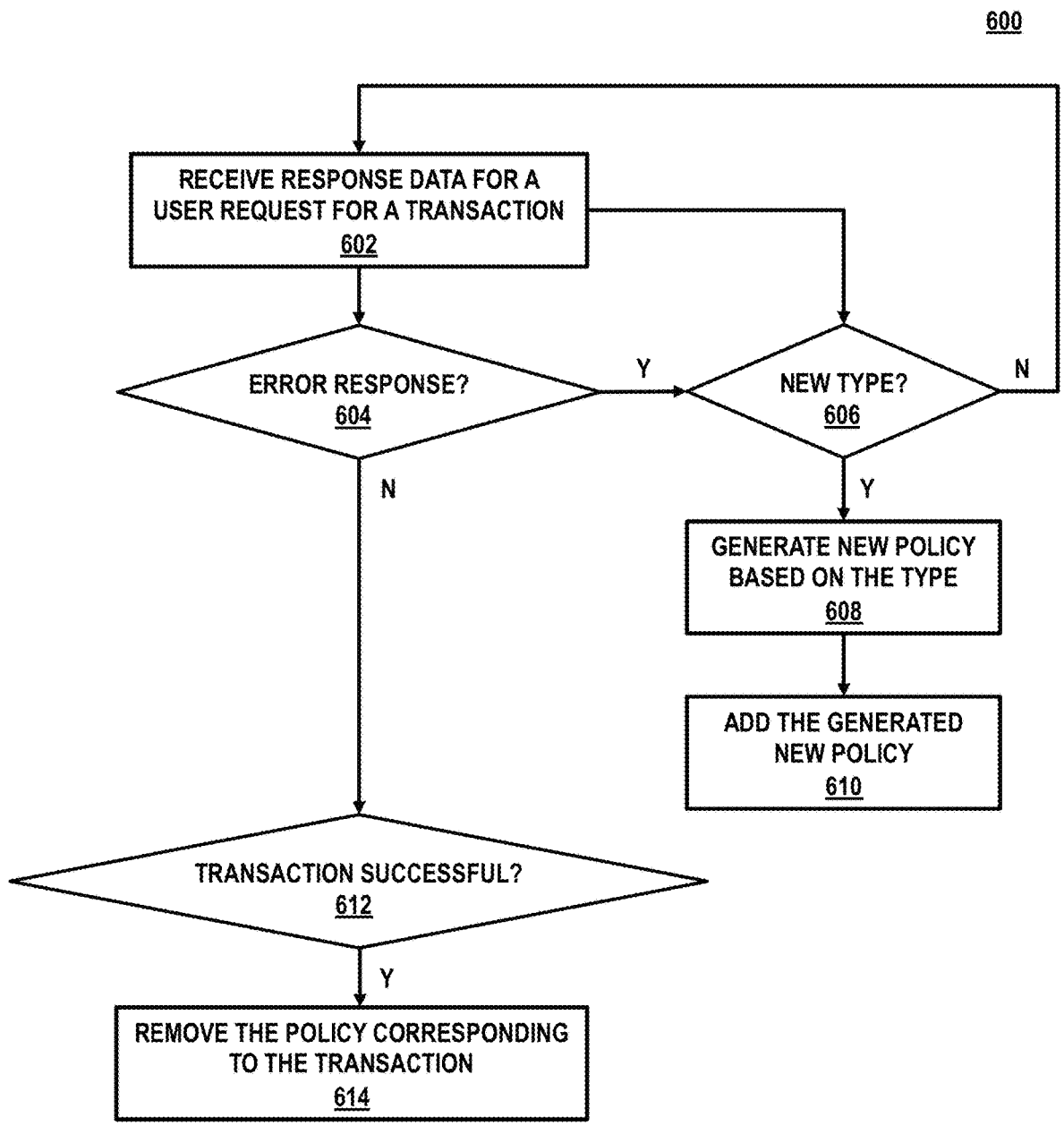
FIG. 6 depicts a flowchart of another exemplary method 600 according to an embodiment of the present invention.

Now referring to FIG. 6, which depicts a flowchart of an exemplary method 600 according to an embodiment of the present invention. At step 602, response data returned to a user request may be received, for example, by the proxy 402 of the ingress gateway 401 of the system 400 in FIG. 4. Then at step 604, it is determined whether the returned response data indicates an error response, for example, by the proxy 402 of the ingress gateway 401 in FIG. 4. This could be easily done by reading a response status code in the returned response data. For example, a status code 400 indicates a 'bad request' error according to HTTP standard. If at step 604, the returned response data is determined to indicate an error response, whether the returned response data indicates an error response of a new type may be determined at step 606, for example, by the proxy 402 of the ingress gateway 401 in FIG. 4. If it is determined that the returned response data indicates a new type of error response, a policy (which is a new policy) may be generated based on the response data at step 606, for example by the policy manager 403 of the proxy 402 in the ingress gateway 401 in FIG. 4. The generation of the policy has been discussed in the above and will not be discussed again for the purpose of brevity. If, however, it is determined that the returned response data does not indicate a new type of error response, the method 600 then flows back to step 602. After generating a new policy in step 608, the method 600 flows to step 610, in which the generated new policy may be added, for example locally to the proxy 402 of the ingress gateway 401 in FIG. 4 by the policy manager 403. At step 612, responsive to the determination at step 604 that indicates the received returned response data does not indicate an error response, it is determined whether the transaction is successful, for example, by the proxy 402 of the ingress gateway 401 in FIG. 4. If the determination indicates that the transaction is successful, the policy corresponding to the transaction may be removed at step 614, for example, by the policy manager 403 of the proxy 402 in the ingress gateway 401 in FIG. 4.

It should be noted that the distributed tracing according to embodiments of this disclosure could be implemented by computer system/server 12 of FIG. 1.

Embodiments of the present invention may be a system, a method, and/or a computer program product at any possible technical detail level of integration. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for distributed tracing, comprising:
   receiving, by one or more processing units, a user request for a transaction;
   extracting, by one or more processing units, feature data from the user request;

determining, by one or more processing units, whether the feature data matches at least one policy generated based on at least one error response received from at least one service;

instructing, by one or more processing units, the at least one service to collect tracing data for the transaction in a head-based fashion responsive to the feature data matching the at least one policy; and instructing, by one or more processing units, the at least one service to collect tracing data for the transaction in a tail-based fashion responsive to the extracted feature data does not match any of the at least one policy.

2. The computer-implemented method of claim 1, further comprising:

determining, by one or more processing units, a further error response received from a service is a new type of error response; and updating, by one or more processing units, the at least one policy by adding a new policy generated based on the further error response.

3. The computer-implemented method of claim 1, further comprising:

determining, by one or more processing units, whether the transaction with tracing data collected is successful; and removing, by one or more processing unit, the at least one policy corresponding to the transaction, responsive to the transaction being successful.

4. The computer-implemented method of claim 1, further comprising:

synchronizing, by one or more processing units, the at least one policy with a policy server.

5. The computer-implemented method of claim 1, further comprising:

instructing, by one or more processing units, the at least one service to send the collected tracing data to a tracing server without storing the tracing data in a corresponding local environment.

6. The computer-implemented method of claim 1, further comprising:

receiving, by one or more processing units, response data for the user request from the at least one service; and generating, by one or more processing units, the at least one policy responsive to the response data indicating an error response.

7. A computer-implemented system for distributed tracing, comprising:

a memory medium comprising program instructions; and a processor, for executing the program instructions, when executing the program instructions causes the system to:

receive a user request for a transaction;

extract feature data from the user request;

determine whether the feature data matches at least one policy generated based on at least one error response received from at least one service;

instruct the at least one service to collect tracing data for the transaction in a head-based fashion responsive to the feature data matching at least one policy; and instruct the at least one service to collect tracing data for the transaction in a tail-based fashion responsive to the extracted feature data does not match any one of the at least one policy.

8. The computer-implemented system of claim 7, when executing the program instructions, the processor further causes the system to:

determine a further error response received from a service is a new type of error response; and update the at least one policy by adding one new policy generated based on the further error response.

9. The computer-implemented system of claim 7, when executing the program instructions, the processor further causes the system to:

determine if the transaction successfully collected the tracing data; and responsive to the transaction successfully collecting the tracing data, remove the policy corresponding to the transaction.

10. The computer-implemented system of claim 7, when executing the program instructions, the processor further causes the system to:

synchronize the at least one policy with a policy server.

11. The computer-implemented system of claim 7, when executing the program instructions, the processor further causes the system to:

instruct the at least one service to send the tracing data to a tracing server without storing the tracing data in a corresponding local environment.

12. The computer-implemented system of claim 7, when executing the program instructions, the processor further causes the system to:

receive response data for the user request from the at least one service; and generate the at least one policy responsive to the response data indicating an error response.

13. A computer program product for distributed tracing, comprising a non-transitory computer readable storage having program codes embodied therewith, the program codes comprising:

program codes to receive a user request for a transaction;

program codes to extract feature data from the user request;

program codes to determine whether the feature data matches at least one policy generated based on at least one error response received from at least one service;

program codes to instruct the at least one service to collect tracing data for the transaction in a head-based fashion responsive to the feature data matching at least one policy; and program codes to instruct the at least one service to collect tracing data for the transaction in a tail-based fashion responsive to the extracted feature data does not match any one of the at least one policy.

14. The computer program product of claim 13, wherein the program codes further comprising:

program codes to determine a further error response received from a service is a new type of error response; and program codes to update the at least one policy by adding one new policy generated based on the further error response.

15. The computer program product of claim 13, wherein the program codes further comprising:

program codes to determine if the transaction successfully collected the tracing data; and responsive to the transaction successfully collecting the tracing data, program codes to remove the policy corresponding to the transaction.

16. The computer program product of claim 13, wherein the program codes further comprising:

program codes to instruct the at least one service to send the tracing data to a tracing server without storing the tracing data in a corresponding local environment.

17. The computer program product of claim 13, wherein the program codes further comprising:
- program codes to receive response data for the user request from the at least one service; and
- program codes to generate the at least one policy, responsive to the response data indicating an error response.

* * * * *